United States Patent [19]

Mee et al.

[11] 4,281,985

[45] Aug. 4, 1981

[54] AUTOMATIC THERMOCOUPLE POSITIONER FOR USE IN VACUUM FURNACES

[75] Inventors: David K. Mee; Albert E. Stephens, both of Knoxville, Tenn.

[73] Assignee: The United States of America as represented by the United States Department of Energy, Washington, D.C.

[21] Appl. No.: 156,955

[22] Filed: Jun. 6, 1980

[51] Int. Cl.³ .......................... F27B 5/04; G01K 1/08; C22B 7/04

[52] U.S. Cl. .................................. 432/205; 13/31 R; 73/343 R; 73/343 B; 266/250; 432/156

[58] Field of Search ....................... 13/31 R; 266/250; 432/205, 156; 73/343 R, 343 B, 375

[56] References Cited

U.S. PATENT DOCUMENTS

| | | | |
|---|---|---|---|
| 2,326,217 | 8/1943 | Hart | 73/343 R |
| 3,468,523 | 9/1969 | Dix | 13/31 |
| 3,598,380 | 8/1971 | Jilek et al. | 73/343 B |
| 3,742,763 | 7/1973 | Sczerba | 73/343 R |
| 3,946,610 | 3/1976 | Sartorius | 73/343 R |

*Primary Examiner*—John J. Camby
*Attorney, Agent, or Firm*—Fred O. Lewis; Stephen D. Hamel; Richard G. Besha

[57] ABSTRACT

The invention is a simple and reliable mechanical arrangement for automatically positioning a thermocouple-carrying rod in a vacuum-furnace assembly of the kind including a casing, a furnace mounted in the casing, and a charge-containing crucible mounted in the furnace for vertical movement between a lower (loading) position and a raised (charge-melting) position. In a preferred embodiment, a welded-diaphragm metal bellows is mounted above the furnace, the upper end of the bellows being fixed against movement and the lower end of the bellows being affixed to support means for a thermocouple-carrying rod which is vertically oriented and extends freely through the furnace lid toward the mouth of the crucible. The support means and rod are mounted for relative vertical movement. Before pumpdown of the furnace, the differential pressure acting on the bellows causes it to contract and lift the thermocouple rod to a position where it will not be contacted by the crucible charge when the crucible is elevated to its raised position. During pumpdown, the bellows expands downward, lowering the thermocouple rod and its support. The bellows expands downward beyond a point where downward movement of the thermocouple rod is arrested by contact with the crucible charge and to a point where the upper end of the thermocouple extends well above the thermocouple support. During subsequent melting of the charge, the thermocouple sinks into the melt to provide an accurate measurement of melt temperatures.

9 Claims, 3 Drawing Figures

AUTOMATIC THERMOCOUPLE POSITIONER FOR USE IN VACUUM FURNACES

This invention is a result of a contract with the U.S. Department of Energy.

BACKGROUND OF THE INVENTION

1. Field of Invention

This invention relates generally to automatic positioners for transducers or sensors. More particularly, it relates to a mechanical arrangement for automatically lifting and lowering a sheathed thermocouple used to determine melt temperatures in a crucible installed in a vacuum furnace.

2. Problem

Referring to the conventional arrangement shown in FIG. 1, the numeral 7 designates a standard vacuum furnace assembly for casting metal. The assembly includes a leaktight casing 9 defining a region 10. Disposed in the region 10 is a furnace assembly 11 including an electrically powered helical coil 17, insulated supports 13 therefor, and an insulating lid 15. A crucible 19 is mounted in the furnace on a hydraulically operated platform 21 for moving the crucible between a lower position (not in view) and the raised position shown. The lid of the furnace carries and is traversed by a tubular retainer 23. Extending freely through the retainer is a sheathed thermocouple 25 for determining molten-metal temperatures in the crucible. The thermocouple, which is designed in the form of a straight tube 27 having a top flange 29 for engaging the top of the retainer, is provided with an electrical output lead 31. (In FIG. 1, the lower portion of the thermocouple tube 27 is shown displaced and cracked, to illustrate a malfunction, to be discussed below.) The thermocouple is provided for continuous monitoring of the temperature of the melt to permit automatic control of the furnacing operation. Thus, proper operation of the thermocouple is important to obtaining a casting whose physical properties meet product specifications.

In a typical operation of the system shown in FIG. 1, initially the casing is at atmospheric pressure and the crucible-and-platform assembly 19, 21 is in a lower position (not shown), where the crucible is charged with irregular metal fragments 33 to be cast. At this time, the thermocouple flange 29 rests on the retainer 23, and the tube 27 extends straight downward toward the mouth of the crucible. After charging, the assembly 19, 21 is raised to the position shown. As the assembly approaches that position, the charge in the crucible contacts the lower end of the thermocouple tube and (assuming proper operation) displaces a portion of the thermocouple upward through the retainer. When the assembly 19, 21 reaches its raised position, the upper end of the thermocouple is well above the lid of the furnace. At this time, region 10 and the interior of the furnace are evacuated to a low operating pressure and the coil 17 is energized for a time sufficient to melt the charge. As the metal fragments supporting the thermocouple melt, the lower end of the tube sinks into the molten charge and remains immersed therein throughout the run. At the end of the run, region 10 and the furnace are returned to atmospheric pressure by backfilling with argon, following which the assembly 19, 21 is retracted to its lower position. During retraction of the assembly the thermocouple 25 drops by gravity to its original retainer-support position.

Unfortunately, when the assembly 19, 21 approaches its raised position, the metal fragments 33 sometimes force the thermocouple tube away from the axis of the retainer 23, resulting in cracking of the tube, as illustrated. In a previous attempt to overcome a similar problem in another furnace, the thermocouple was provided with a support rod which extended outside the furnace casing through a Wilson seal. This arrangement permitted the thermocouple to be raised and lowered manually. For instance, before the crucible was raised to the position shown, a mechanic loosened the Wilson seal, lifted the rod to retract the thermocouple to a position where it would not be contacted by the fragments 33, and then re-tightened the seal. Following melting of the fragments, he loosened the seal, lowered the rod to position the thermocouple in the melt, and then re-tightened the seal. This arrangement was not very satisfactory, however, since it required personal attention and resulted in some inleakage of air into the casing through the loosened seal.

SUMMARY OF THE INVENTION

Objects

It is an object of this invention to provide a novel thermocouple-positioner for use with vacuum furnaces.

It is another object to provide a mechanical positioner which can be mounted within a vacuum-furnace casing and which automatically moves a sheathed thermocouple toward and away from a furnace crucible, along a vertical axis.

It is another object to provide a comparatively simple and reliable mechanical arrangement for automatically bringing a sheathed thermocouple into contact with solids in a vacuum-furnace crucible prior to a melting operation and for automatically retracting the thermocouple after the melting operation has been completed, the arrangement being designed for use within the vacuum-casing for the furnace.

Additional objects, advantages and novel features of the invention will be set forth in part in the description which follows, and in part will become apparent to those skilled in the art upon examination of the following or may be learned by practice of the invention. The objects and advantages of the invention may be realized and attained by the means specified in the appended claims.

SUMMARY

The invention is designed for automatically positioning a thermocouple-carrying rod in a vacuum-furnace assembly which contains a casing, a furnace, and a crucible containing solids to be melted when the casing is evacuated. In a preferred embodiment, the invention comprises a vertically oriented, evacuated bellows which is mounted over the crucible. The upper end of the bellows is fixed; the lower end of the bellows carries means for supporting the thermocouple rod, which is vertically oriented and extends toward the mouth of the crucible. The thermocouple rod and the support are coupled for relative movement in the vertical direction. The bellows responds to pumpdown of the casing from atmospheric pressure by expanding toward the crucible to lower the support and thermocouple to a first position where the thermocouple rests on the solids in the crucible and, with downward movement of the thermocouple now arrested by the solids, to lower the support to a second position.

The drawings are not to scale.

DETAILED DESCRIPTION OF THE INVENTION

Figure 1:
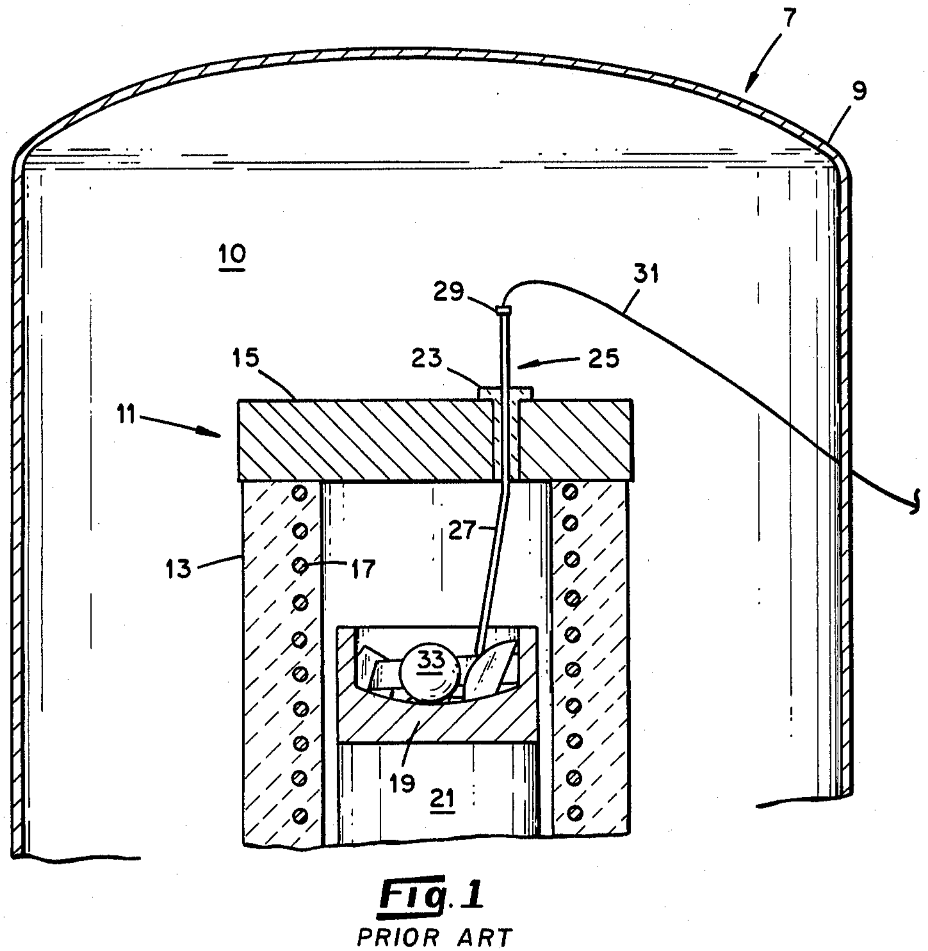
Fig. 1 PRIOR ART
FIG. 1 is a schematic diagram of a conventional vacuum-furnace assembly provided with a vertically displaceable sheathed thermocouple of conventional design.

The invention is generally applicable to vacuum furnaces and the like. For brevity, it will be described as used in conjunction with a vacuum-furnace assembly of the kind described above and shown in FIG. 1.

Figure 2:
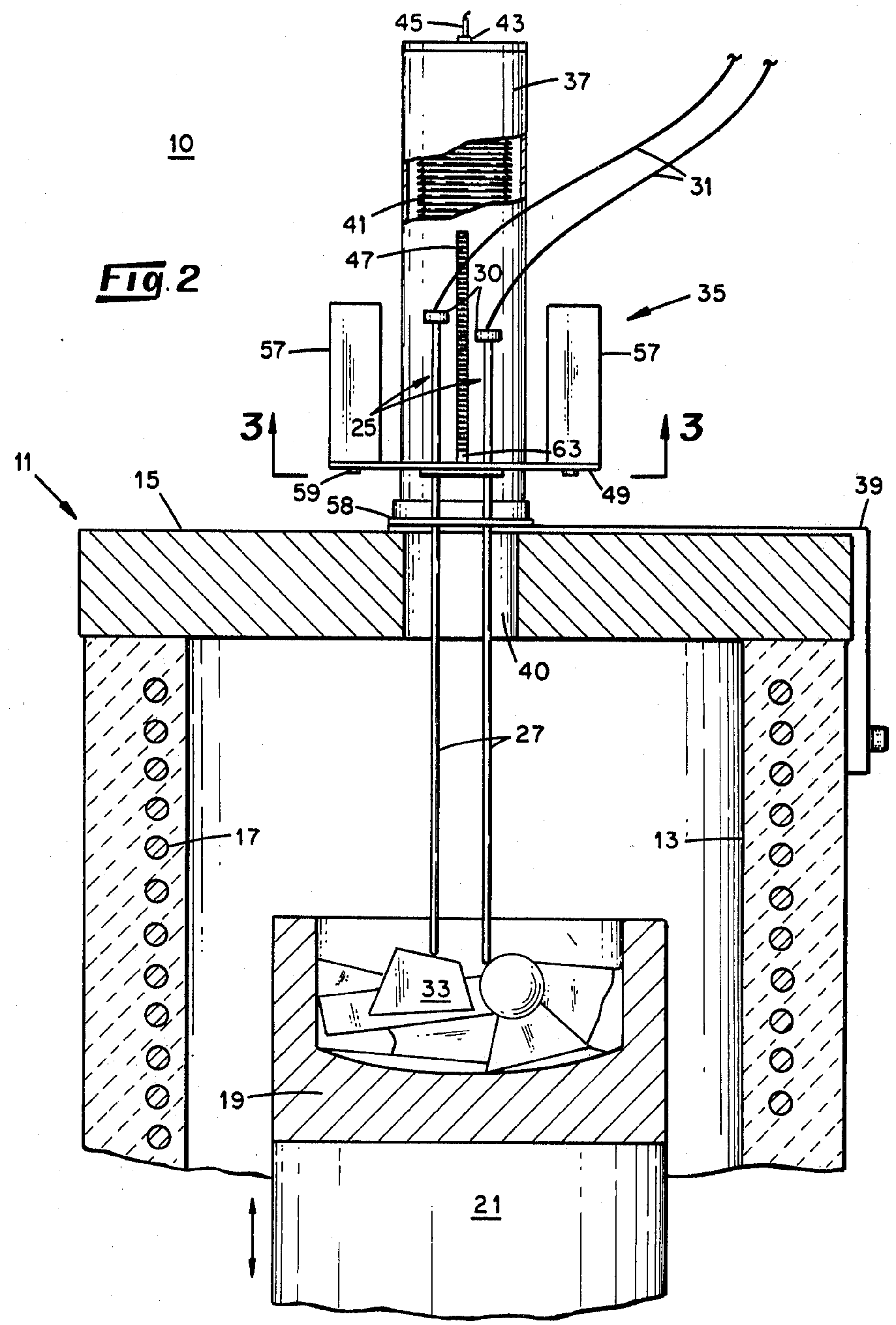
FIG. 2 is a schematic diagram of part of the furnace assembly shown in FIG. 1, as provided with a thermocouple positioner designed in accordance with the invention.

Referring to FIG. 2, the novel thermocouple positioner comprises an assembly 35. The assembly includes a tubular housing 37, which is supported by a bracket 39 bolted to a furnace coil support 13. As shown, the housing 37 is positioned just above the furnace lid and is in register with an opening 40 therein, as well as with the interior of the crucible 19. Coaxially mounted in the housing is an evacuated conventional welded-diaphragm metal bellows 41 of the welded-diaphragm type and including welded end caps. The upper end cap of the bellows is affixed to the top end of the housing 37, as by means of a bolt 43 threaded into the cap. The upper end cap is formed with a vertical bore communicating with the interior of the bellows, and a bellows-evacuation tube 45 is fitted in the bore and welded to the cap. Following evacuation of the bellows, the external end of the tube is sealed in any suitable manner. In FIG. 2 the bellows is shown in an extended position, to be described.

The bellows housing 37 is formed with vertically extending opposed slots 47, one of which is in view in FIG. 2. The bottom face of the lower end cap 63 (FIG. 2) for the bellows is affixed to and supports a horizontally disposed plate assembly 46, including plate **49*a* having the configuration shown in FIG. 3 and a thickness less than the width of slots 47. The end cap is affixed to a central portion 51 of the plate. The portion 51 is formed with webs 53 which extend respectively and freely through the housing slots 47 to support a separable external rectangular platform 49. The platform 49 extends freely about the housing 37. In the preferred embodiment, two similar metal weights 57 (FIG. 2) are mounted on the plate 49, on opposite sides of the housing 37, to damp the retraction of the thermocouples and to promote extension of the bellows under conditions to be described. The weights are adjustably mounted, by means of screws 59 passed through slots 61 (FIG. 3) in the plate, so that the weights may be balanced about the central portion 51 to avoid binding of the bellows in the housing. A skirt assembly (not shown) comprising a carbon disc mounted on an inverted stainless steel cup is attached to depend from the plate assembly 46**; this helps to center the bellows in the housing and protect against binding.

In the embodiment shown in FIG. 2, two conventional sheathed thermocouples 25, each having an output lead 31, are mounted to extend freely through respective apertures 55 (FIG. 3) provided in the plate 49. Thus, each thermocouple and its support are arranged for relative translatory movement in the vertical direction. Each thermocouple is formed with a top flange 30, or stop, for imposing a limit to downward movement of the thermocouples relative to the plate 49. As shown, a thermocouple guide plate 58 is affixed to the bracket 39 and is provided with two apertures (not shown) for respectively accommodating the thermocouples.

Figure 3:
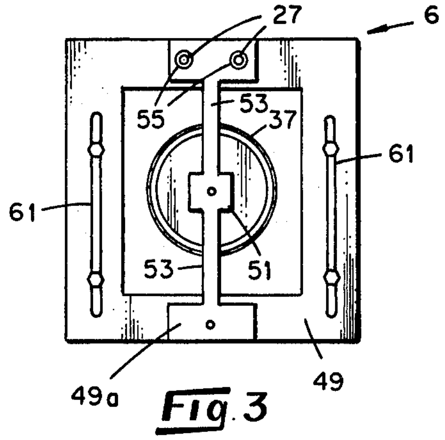
FIG. 3 is a bottom view taken along line 3—3 of FIG. 2.

In a typical operation of the system shown in FIGS. 2 and 3, initially the assembly 19, 21 is in its retracted (lower) position for loading of the crucible. The interior of the furnace casing is at atmospheric pressure, and as a result the evacuated bellows 41 is subject to a differential pressure causing it to assume a most-retracted position where, in the illustrative embodiment, the plate 49 is engaged with the top ends of the slots 47. In that position, the thermocouple flanges rest on the plate 49 and the lower ends of the thermocouples are well above the position assumed by the crucible 19 when in its raised position.

After loading, the crucible is raised to the position shown, and the interior of the furnace casing is pumped down to normal operating pressure. During pump-down, the differential pressure acting on the bellows gradually decreases, with the result that when normal operating pressure has been reached, the bellows has expanded downward to a most-extended position where the plate 49 contacts the bottom ends of the slots 47. Before the expanding bellows reaches that position, the lower ends of the thermocouples contact the fragments 33 in the crucible, and downward movement of the thermocouples is arrested. The remainder of the bellows-supported assembly continues to move downward, until the bellows reaches its most-expanded position (FIG. 2). The flanged ends of the thermocouples now are in a position well above the plate 49. With the furnace at operating pressure, the induction coil 17 is energized. As the metal fragments 33 melt, the thermocouples sink in the melt and thus are in the desired immersed position for providing accurate temperature measurements throughout the run. It will be noted that, in contrast to the prior art (FIG. 1), no external force is being applied to the thermocouples 25 as they are brought into contact with the metal fragments 33.

At the end of the melting operation, the coil 17 is de-energized and the crucible emptied while in raised position. The furnace then is backfilled with argon to atmospheric pressure, following which the crucible-platform assembly is returned to its lower position. During backfilling, the bellows gradually contracts, returning the entire bellows-supported assembly to its most-contracted state, where the lower ends of the thermocouples are well above the position to be assumed by the crucible when elevated for the next melting operation.

EXAMPLE

A thermocouple-positioner of the kind illustrated in FIGS. 2 and 3 was fabricated and tested in a conventional vacuum-furnace assembly. In this embodiment, the welded-diaphragm bellows 41 was of conventional design manufactured by Sealol, Inc., and was evacuated to 10 $\mu$m Hg. The bellows, which had an outside diameter of 1.710" and an inside diameter of 0.970", comprised 0.004"-thick Inconel plates and had 339 convolutions. The internal diameter of the housing was 2.060". The bellows weights 57 were composed of stainless steel; each weighed 5 lbs. The thermocouples were of standard design, being of the Pt-Pt10Rh type, the sheath being mullite. Each thermocouple had a length of 18".

With the interior of the furnace casing at atmospheric pressure (bellows in its most-contracted position), the lower ends of the thermocouples were disposed about 3.9" above the position occupied by the metal fragments when the crucible was raised. After pumpdown to about 1" Hg (well above the typical operating pressure 50 μm Hg), the bellows had extended 10.1", to its most-extended position; at this time the plate 49 was in contact with the lower ends of slots 47, the thermocouples rested on the solids in the crucible, and the thermocouple flanges 30 were disposed about 5.2" above the plate 49. In various test runs, the temperatures of uranium melts were monitored with the above-mentioned thermocouples and also with a conventional optical pyrometer (the point measured optically was closer to the crucible's center, making it slightly cooler than the point where the thermocouple measurement was made.) Following temperature-stabilization of the melts, the pyrometer measurement and the thermocouple measurements tracked within 21.5° C. at 1320° C. (pyrometer measurement being the lower; the standard deviation was 5.8° C.). The positioner was tested in various furnace runs and performed entirely satisfactory, with no damage to the thermocouples 25. The length of the typical run was about 45 min.

The foregoing description of a preferred embodiment of the invention has been presented for purposes of illustration and description. It is not intended to be exhaustive or to limit the invention to the precise form disclosed, and obviously many modifications and variations are possible in light of the above teaching. For instance, the positioner is not limited to sheathed thermocouples but may be used to position elongated means carrying various other kinds of transducers or sensors, such as a position-sensing probe. Again, the positioner is not applicable only to casting furnaces but may be used in various other apparatus operated at subatmospheric pressures. The illustrated embodiment was chosen and described in order to best explain the principles of the invention and its practical application to enable others skilled in the art to best utilize the invention in various embodiments and with various modifications as are suited to the particular use contemplated. It is intended that the scope of the invention be defined by the claims appended hereto.

What is claimed is:

1. In a vacuum-furnace assembly including a casing, a furnace therein, and a crucible in said furnace, said crucible containing solids to be melted when said casing is evacuated to a low pressure, the improvement comprising:

- an evacuated, vertically oriented bellows disposed in said casing and above said crucible, the upper end of said bellows being fixed and the exterior of said bellows being exposed to the atmosphere in said casing,
- thermocouple-support means carried by the lower end of said bellows, and
- a vertically extending sheathed thermocouple carried by said support and extending toward the mouth of said crucible, said thermocouple and support being coupled for relative vertical movement,
- said bellows responding to pumpdown of said casing from atmospheric pressure to said pressure by expanding toward said crucible to effect (1) lowering of said support and thermocouple to a first position where said thermocouple rests on said solids and (2) further lowering of said support to a second position while said thermocouple rests on said solids.

2. The apparatus of claim 1 wherein said thermocouple extends through an aperture in said support, the portion of said thermocouple above said support being provided with means imposing a limit to downward movement of said thermocouple relative to said support.

3. The apparatus of claim 1 wherein said furnace includes a cover having an opening and wherein said bellows is disposed outside said furnace, with said lower end of the thermocouple extending through said opening.

4. The apparatus of claim 1 wherein said bellows is a welded-diaphragm metal bellows.

5. In a vacuum-furnace assembly including a casing, a furnace therein, and a crucible in said furnace containing solids to be melted when said casing is evacuated to a low pressure, the improvement comprising:

- an evacuated, vertically oriented bellows disposed in said casing above said crucible, the upper end of said bellows being fixed and the exterior of said bellows being exposed to the atmosphere in said casing,
- thermocouple-support means carried by the lower end of said bellows,
- a vertically extending thermocouple-containing rod mounted to said support to extend downwardly therefrom toward the mouth of said crucible, said rod and support being mounted for relative vertical movement,
- said bellows responding to pumpdown of said casing to said pressure by expanding to effect (a) simultaneous lowering of said rod and support until downward movement of said rod is arrested by said solids, and (b) further lowering of said support to a selected position while movement of said thermocouple is so arrested.

6. The apparatus of claim 5 wherein said bellows is a welded-diaphragm metal bellows.

7. The apparatus of claim 6 wherein said means is a horizontally extending member having an aperture.

8. The apparatus of claim 7 wherein said rod extends through said aperture and the portion of said rod extending above said member is provided with stop means for imposing a limit to downward movement of said rod through said aperture.

9. In a vacuum-furnace assembly including a casing containing a solid to be contacted with a sensor when said casing is evacuated to a low pressure, the improvement comprising:

- an evacuated, vertically oriented bellows disposed in said casing and above said solid, the upper end of said bellows being fixed and the exterior of said bellows being exposed to the atmosphere in said casing,
- a support carried by the lower end of said bellows and
- vertically extending sensor-carrying means carried by said support and extending toward the mouth of said crucible, said means and support being coupled for relative vertical movement,
- said bellows responding to pumpdown of said casing from atmospheric pressure to said pressure by expanding toward said crucible to effect
  - (1) lowering of said support and means to a first position where said means rests on said solid and
  - (2) further lowering of said support to a second position while said means rests on said solid.

* * * * *